(12) United States Patent
Lawson, Jr.

(10) Patent No.: US 6,860,512 B2
(45) Date of Patent: *Mar. 1, 2005

(54) UTILITY MOTOR VEHICLE WITH CARRIER

(76) Inventor: William M. Lawson, Jr., P.O. Box 45020, Phoenix, AZ (US) 85064-5020

( * ) Notice: Subject to any disclaimer, the term of this patent is extended or adjusted under 35 U.S.C. 154(b) by 0 days.

This patent is subject to a terminal disclaimer.

(21) Appl. No.: 10/660,895

(22) Filed: Sep. 12, 2003

(65) Prior Publication Data

US 2004/0124033 A1 Jul. 1, 2004

Related U.S. Application Data

(63) Continuation-in-part of application No. 09/504,648, filed on Feb. 14, 2000, now Pat. No. 6,631,925.

(51) Int. Cl.[7] .............................................. B62D 21/00
(52) U.S. Cl. ..................... 280/781; 180/291; 180/65.1
(58) Field of Search .............................. 180/65.1, 65.5, 180/65.8, 446; 280/781

(56) References Cited

U.S. PATENT DOCUMENTS

| | | |
|---|---|---|
| 2,336,511 A | 12/1943 | Stolte |
| 2,415,596 A | 2/1947 | Larison |
| 2,468,316 A | 4/1949 | Waters |
| 3,684,046 A | 8/1972 | Begleiter |
| 3,799,283 A | 3/1974 | Freber |
| 3,829,117 A | 8/1974 | Park |
| 3,842,928 A | 10/1974 | Kishi |
| 4,185,711 A * | 1/1980 | Lawrence et al. .......... 180/214 |
| 4,217,970 A | 8/1980 | Chika |
| 4,475,618 A | 10/1984 | Kennedy et al. |
| 4,535,869 A | 8/1985 | Tsutsumikoshi et al. |
| 4,562,893 A * | 1/1986 | Cunard ..................... 180/6.5 |
| 4,614,249 A | 9/1986 | Yamanaka |
| 4,629,023 A | 12/1986 | Carpanelli et al. |
| 4,643,695 A | 2/1987 | Kennedy et al. |
| 4,682,668 A | 7/1987 | Salmon et al. |
| 4,709,958 A * | 12/1987 | Harrod ....................... 296/177 |
| 4,798,400 A | 1/1989 | Kosuge |
| 4,861,058 A | 8/1989 | Cresswell |
| 4,988,143 A * | 1/1991 | Harrod ....................... 296/177 |
| 5,036,938 A | 8/1991 | Blount et al. |
| 5,042,607 A * | 8/1991 | Falkenson et al. .......... 180/208 |
| 5,238,267 A | 8/1993 | Hutchison et al. |
| 5,307,889 A * | 5/1994 | Bohannan ..................... 180/13 |
| 5,312,126 A | 5/1994 | Shortt et al. |
| 5,323,867 A * | 6/1994 | Griffin et al. ................. 180/22 |
| 5,363,934 A | 11/1994 | Edmund et al. |
| 5,740,878 A | 4/1998 | Sala |
| 5,845,724 A | 12/1998 | Barrett |
| 5,921,341 A | 7/1999 | Atkins |
| 5,924,506 A | 7/1999 | Perego |
| 5,984,356 A | 11/1999 | Uphaus |
| 5,992,556 A * | 11/1999 | Miller ........................ 180/446 |
| 6,026,923 A | 2/2000 | Uphaus |
| 6,105,982 A | 8/2000 | Howell et al. |
| 6,405,817 B1 * | 6/2002 | Huntsberger et al. ...... 180/65.1 |
| 6,631,925 B1 * | 10/2003 | Lawson, Jr. ................ 280/781 |
| 6,656,010 B1 * | 12/2003 | Bienz et al. ................ 446/431 |

* cited by examiner

*Primary Examiner*—Lesley D. Morris
*Assistant Examiner*—L. Lum
(74) *Attorney, Agent, or Firm*—Cahill, Von Hellens & Glazer P.L.C.

(57) ABSTRACT

A miniaturized four wheel vehicle includes a forwardly located compartment for transporting articles. Robust side mounted footrests, in combination with a forwardly canted steering handlebar urges a driver to lean into a turn to enhance stability during turns. The motor and related heavy components are mounted low on the frame to maintain the center of gravity close to the ground. A drive train of cog wheels and cog belt ensure corresponding rotation of the motor and rear axle to maintain affirmative control over forward and rearward movement. If an electric motor is used, soft start circuitry prevents abrupt starts. By mounting the front and rear axles at different heights relative to the frame, the frame will cant forwardly downwardly for better control and maneuverability.

26 Claims, 14 Drawing Sheets

UTILITY MOTOR VEHICLE WITH CARRIER

CROSS REFERENCE TO RELATED APPLICATIONS

The present application is a continuation in part of a patent application entitled "Miniaturized Motor Vehicle", Ser. No. 09/504,648 filed Feb. 14, 2000 now U.S. Pat. No. 6,631,925.

BACKGROUND OF THE INVENTION

This invention related to four wheeled miniaturized motor vehicles capable of transporting a grown adult in a seated position that are lightweight, easily stored or transported, have good stability and maneuverability and include the capability of also transporting a load of articles.

Previous four wheeled motor vehicles of reduced size include vehicles for street or track use commonly known as "go-carts". Typically, go-carts have a seat that is fixed to the frame between the axles. The engine, which is generally a gasoline powered single cylinder engine, is located behind the seat and in front of the rear axle. The accelerator and foot-brake pedals are disposed close to the front axle a fixed distance from the seat. Thus, a single go-cart cannot be readily adapted to accommodate riders of various sizes. As a result, multiple sizes of go-carts must be available to accommodate persons of different sizes and whether children or adults.

The structure of a go-cart makes it difficult for the driver to transfer his weight laterally and fore/aft while driving in order to better maneuver the vehicle. The driver can only shift his weight to some extent laterally, but he cannot make a meaningful shift of his weight from fore/aft, because he must always keep his feet on the pedals. Thus, the structure of a go-cart does not allow for the driver to transfer his weight except to a limited extent while driving the vehicle.

It is a primary object of the present invention to provide a small, high visibility, stable, maneuverable, four wheeled motorized vehicle capable of carrying a load.

Another object of the primary invention is to provide a motor vehicle that is lightweight and that can be easily transported or stored in a small space.

Still another object of the present invention is to provide a utilitarian highly maneuverable motor vehicle suitable for use in warehouses and the like where a load carrying capability is useful.

Yet another object of the present invention is to provide an electric powered miniaturized motor vehicle for use in commercial locations.

A further object of the present invention is to provide an electric powered miniaturized motor vehicle having conventional safety features embodied in full size vehicles used in limited access commercial locations for transporting persons and articles.

A still further object of the present invention is to provide a highly maneuverable stable miniaturized electric powered vehicle adapted to maneuver long narrow passageways.

A yet further object of the present invention is to provide circuitry for controlling operation of an electric powered miniaturized vehicle limit acceleration for safety reasons while accommodating a relatively high velocity of travel.

These and other objects of the present invention will become apparent to those skilled in the art as the description of the invention proceeds.

SUMMARY OF THE INVENTION

A miniaturized motor vehicle includes a frame, a rear axle supporting a pair of rear wheels, a motor mounted to the frame, a transmission coupled to the rear axle, and a front axle supporting a pair of front wheels. A removably mounted steering assembly provides steering for the front wheels. A removably mounted seat is adjustable in height to accommodate drivers of various sizes. A pair of frame mounted footrests provide a platform for the driver's feet and enhances weight shifting on turns. A front located compartment permits hands free transport of various articles.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
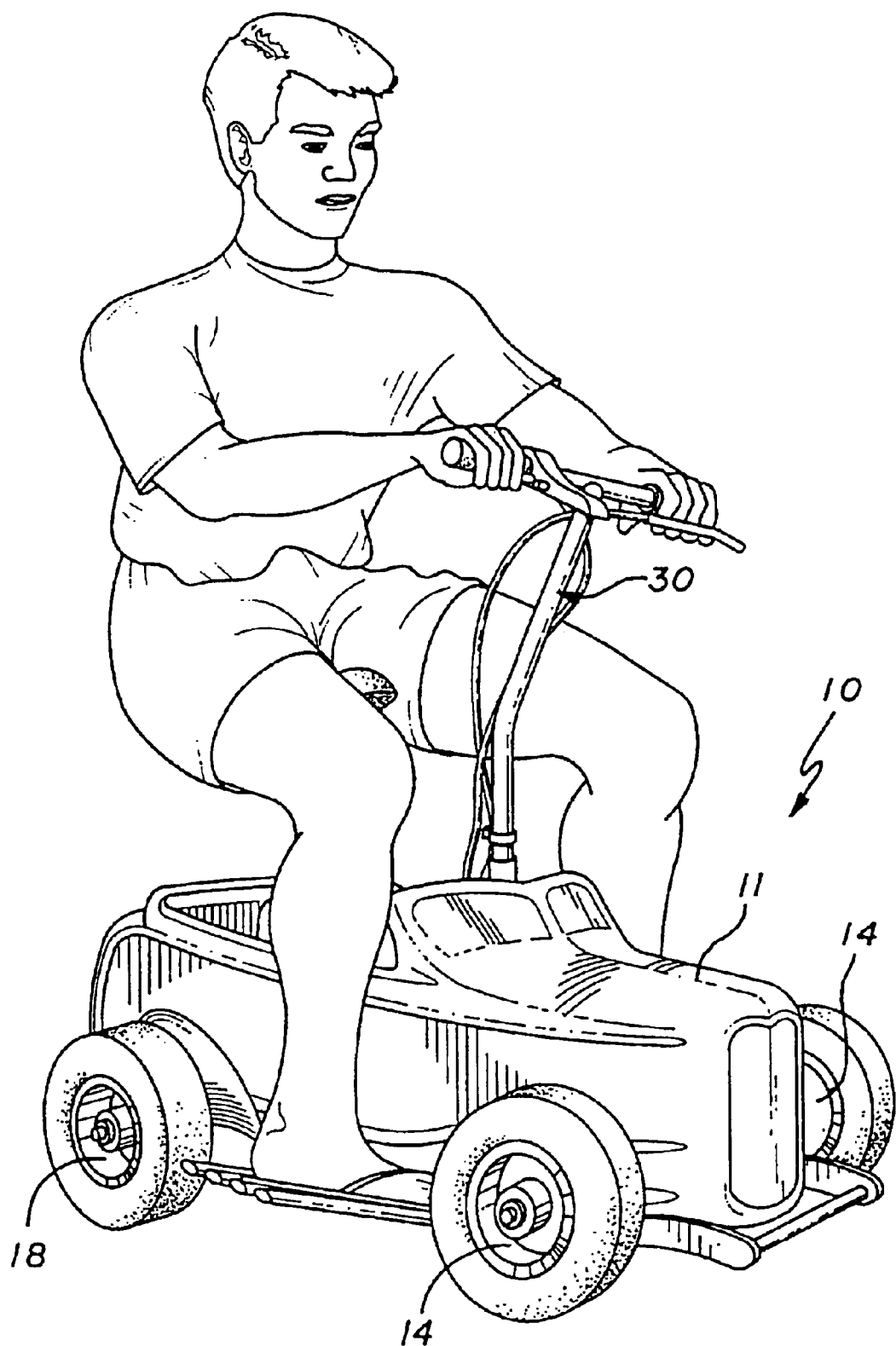
FIG. 1 is a perspective view of a miniaturized motor vehicle showing a driver mounted on the vehicle.
Figure 2:
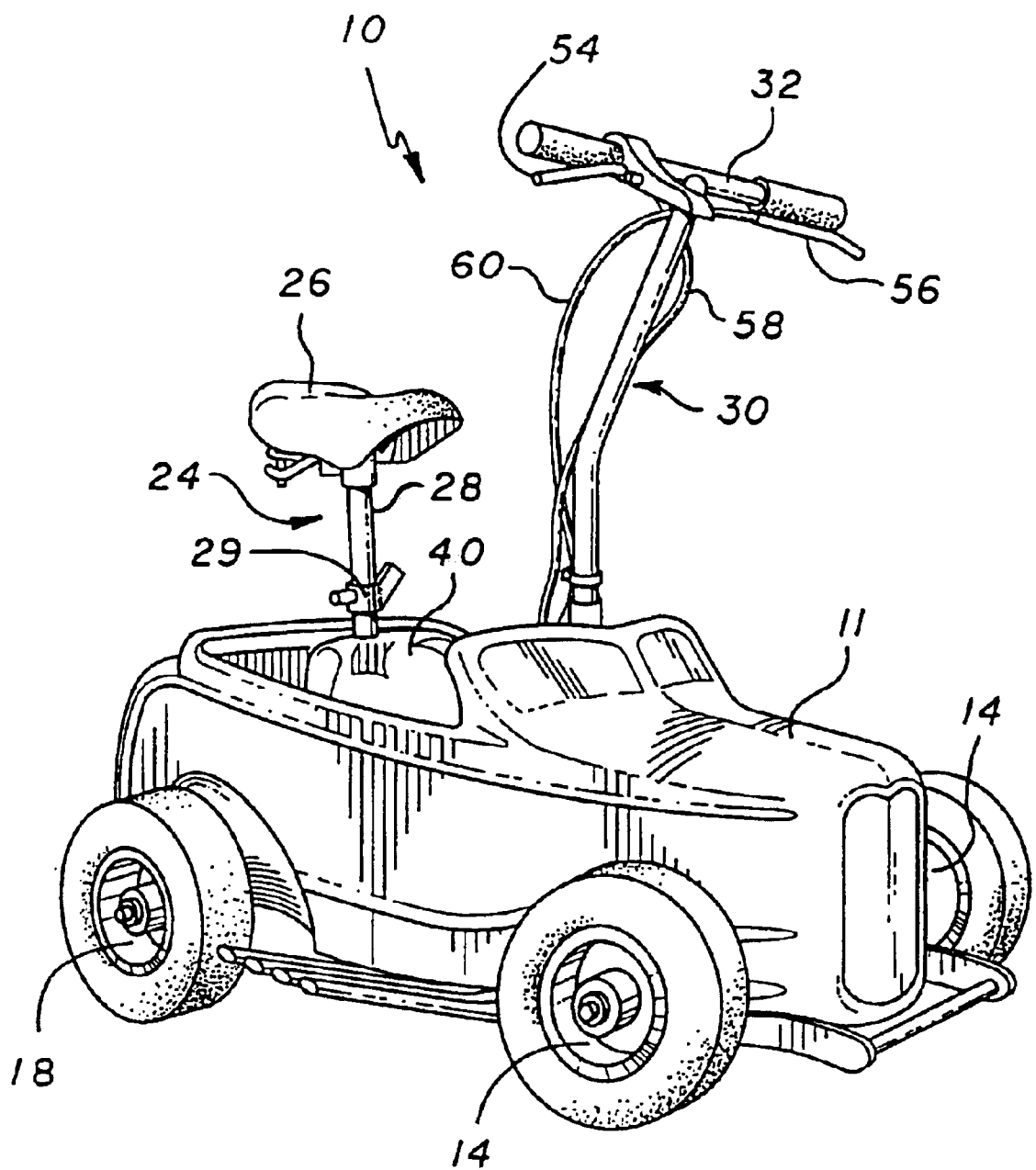
FIG. 2 is a perspective view of the miniaturized motor vehicle having an exemplary body style.
Figure 3:
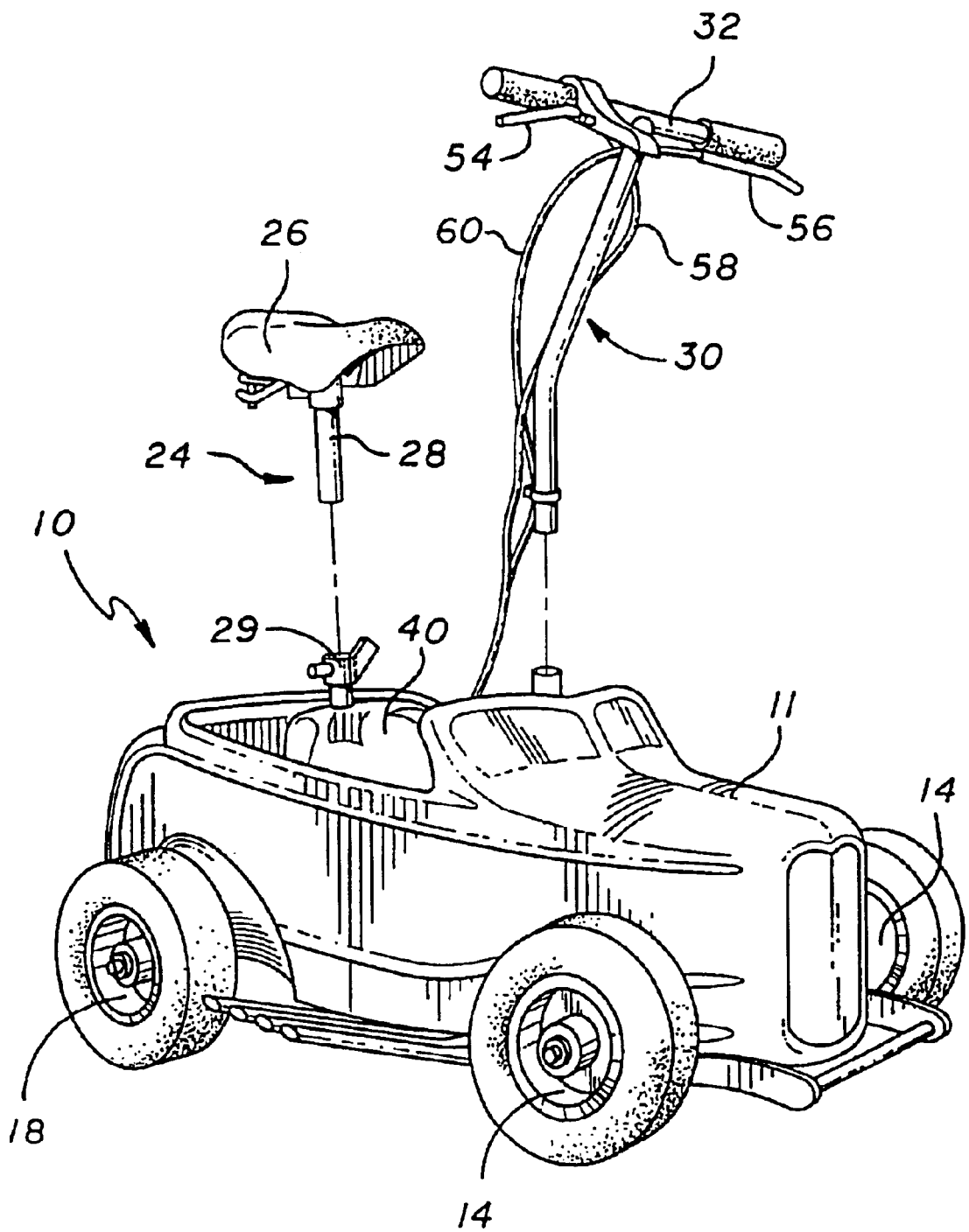
FIG. 3 is a perspective view depicting removal of the seat and steering assemblies.

Referring to FIGS. 1–4, there is shown a miniaturized motor vehicle 10. The motor vehicle includes a body 11 (replicating a '32 Ford) mounted on a frame 12. Front wheels 14 are rotatably mounted on a front axle and rear wheels 18, 19 are mounted on a rear axle. A seat assembly 24 is mounted on the frame forwardly of the rear axle to improve front-to-rear stability during acceleration and braking. The seat assembly includes a seat 26 mounted on a seat support member 28, which member is adjustable in height and removably mounted on frame 12. A steering assembly 30 is also removably mounted on the frame between the seat assembly and the front axle.

FIGS. 4, 5, 5B and 5C show frame 12 formed by a generally U-shaped tubular member 13 having a right frame leg 15a and a left frame leg 15b extending toward the front of the vehicle. Front axle 16 is formed of a tubular member rigidly fixed across right and left frame legs 15a, 15b by welding. The front axle is of the type typically known as a "drop axle" having the centerline of the front axle below an imaginary axis extending through the center of front wheels 14. Thereby, U-shaped member 13 extends in a plane that is slightly declined from rear axle 20 to front axle 16. This cant or tilt aids in transferring the driver's weight toward the front of the vehicle to assist in providing stability and maneuverability.

A transverse member 17 is rigidly fixed between right and left frame legs 15a, 15b at a point between rear axle 20 and front axle 16. The transverse member may be a tubular member having a rectangular cross-section and is preferably made of steel. A longitudinal member 21 is rigidly fixed between the closed end 13a of U-shaped member 13 and transverse member 17 above rear axle 20 and between and generally parallel with the right and left frame legs 15a, 15b. The longitudinal member is may be made of square tubing to facilitate attachment of brackets.

A seat standard 23 extends generally perpendicularly upwardly from longitudinal member 21 at a point near and forward of rear axle 20 for receiving the seat assembly 24. The seat standard includes a tubular member adapted to telescopically receive seat support member 28. A side support member 25 extends from each of the right and left frame legs 15a, 15b to a point on the seat standard above the plane formed by U-shaped member 13 to provide lateral support for the seat standard. In addition, a rear support member 27 is rigidly fixed between the rear end of longitudinal member 21 and a point on the seat standard above the plane formed by the U-shaped member to provide longitudinal support for the seat standard. The seat standard includes a releaseable seat clamp 29 to allow for height adjustment and removal of seat 26 and seat support member 2. The seat can be adjusted in height by opening the clamp and raising or lowering the seat support member within the seat standard. The seat assembly can also be removed from the vehicle by opening the seat clamp and sliding the seat support member upwardly and completely out of the seat standard.

As shown in FIGS. 1, 2, 3 and 4, a footrest 36 extends outwardly from each of right and left frame legs 15a, 15b to provide a platform for the driver's feet and to assist in weight shifting left, right and forwardly. Each footrest 36 is fixed to a footrest plate 38 rigidly mounted transversely between the right and left frame legs 15a, 15b. It may be noted that each footrest is configured as four simulated exhaust pipes to replicate a hoped-up '32 Ford.

Figure 4:
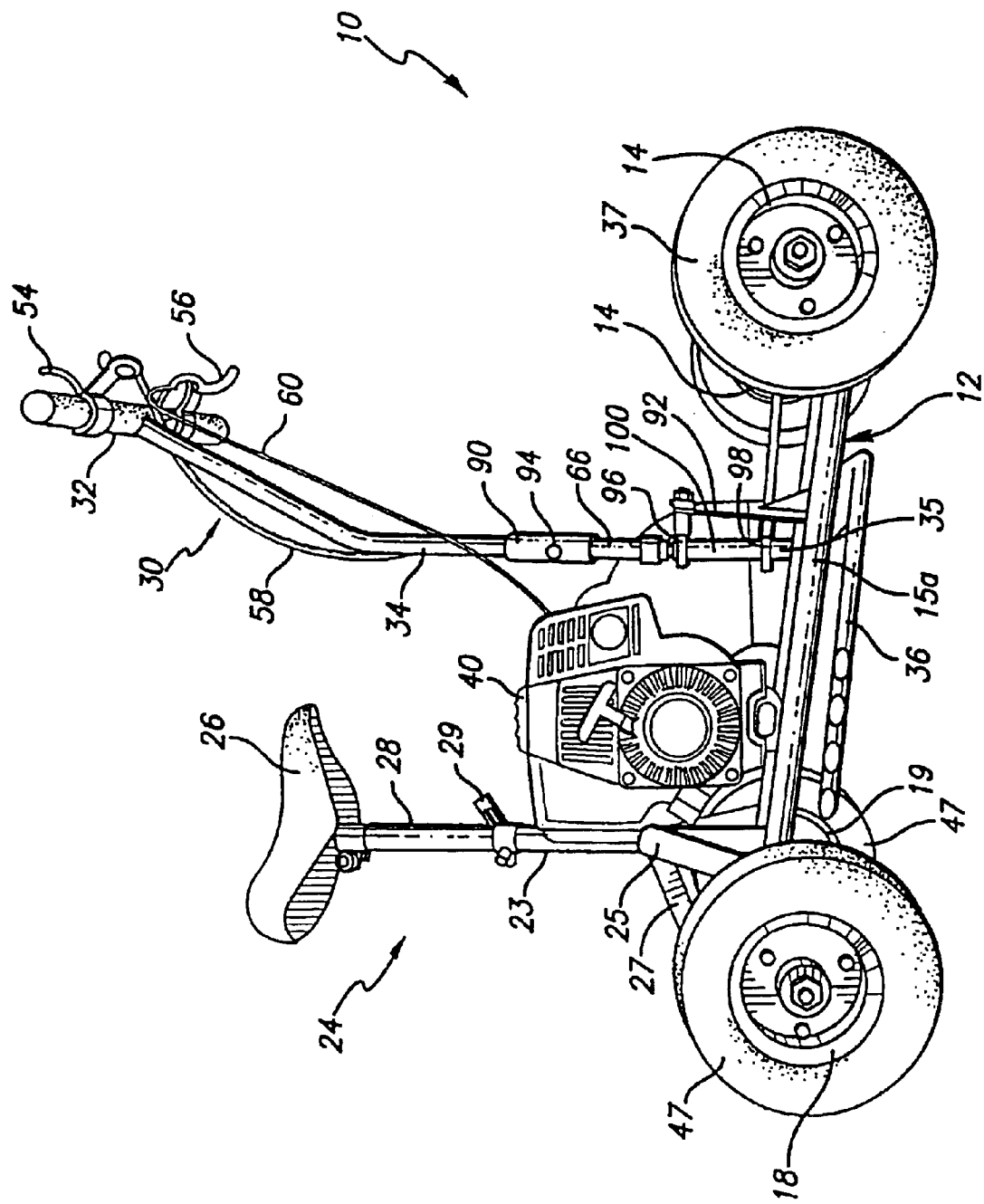
FIG. 4 is an elevational side view of the motor vehicle shown without the body.
Figure 5:
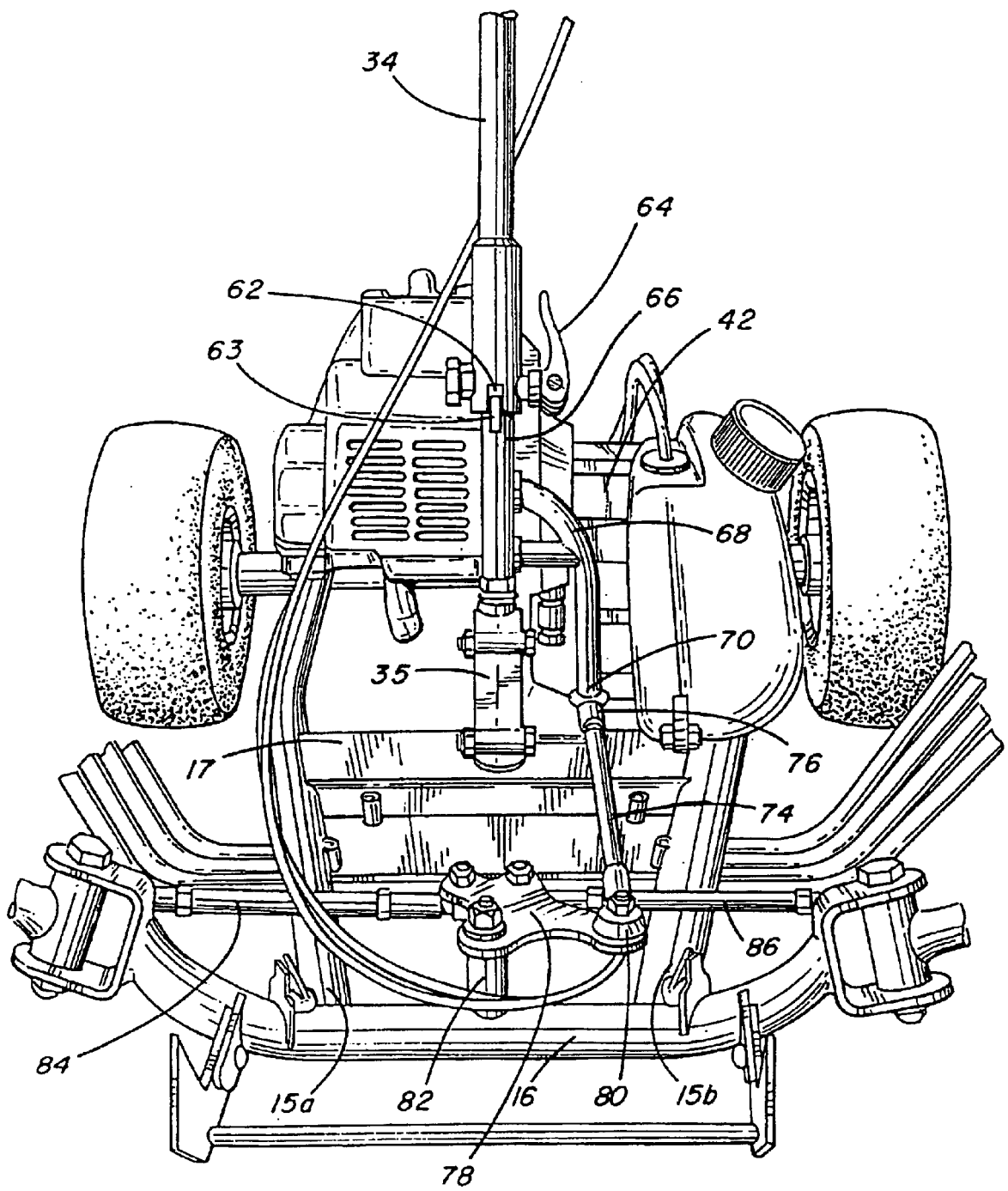
FIG. 5 is a front perspective view of the motor vehicle showing the steering mechanism.
Figure 5A:
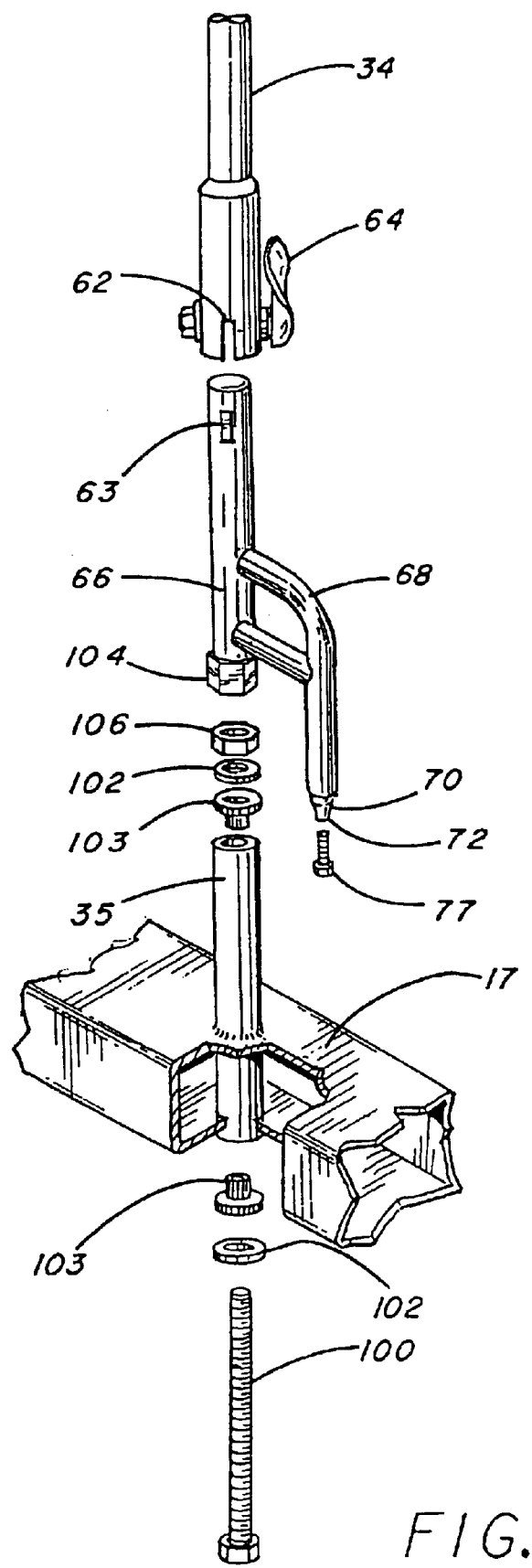
FIG. 5A is an exploded view of a portion of the steering mechanism.
Figure 5B:
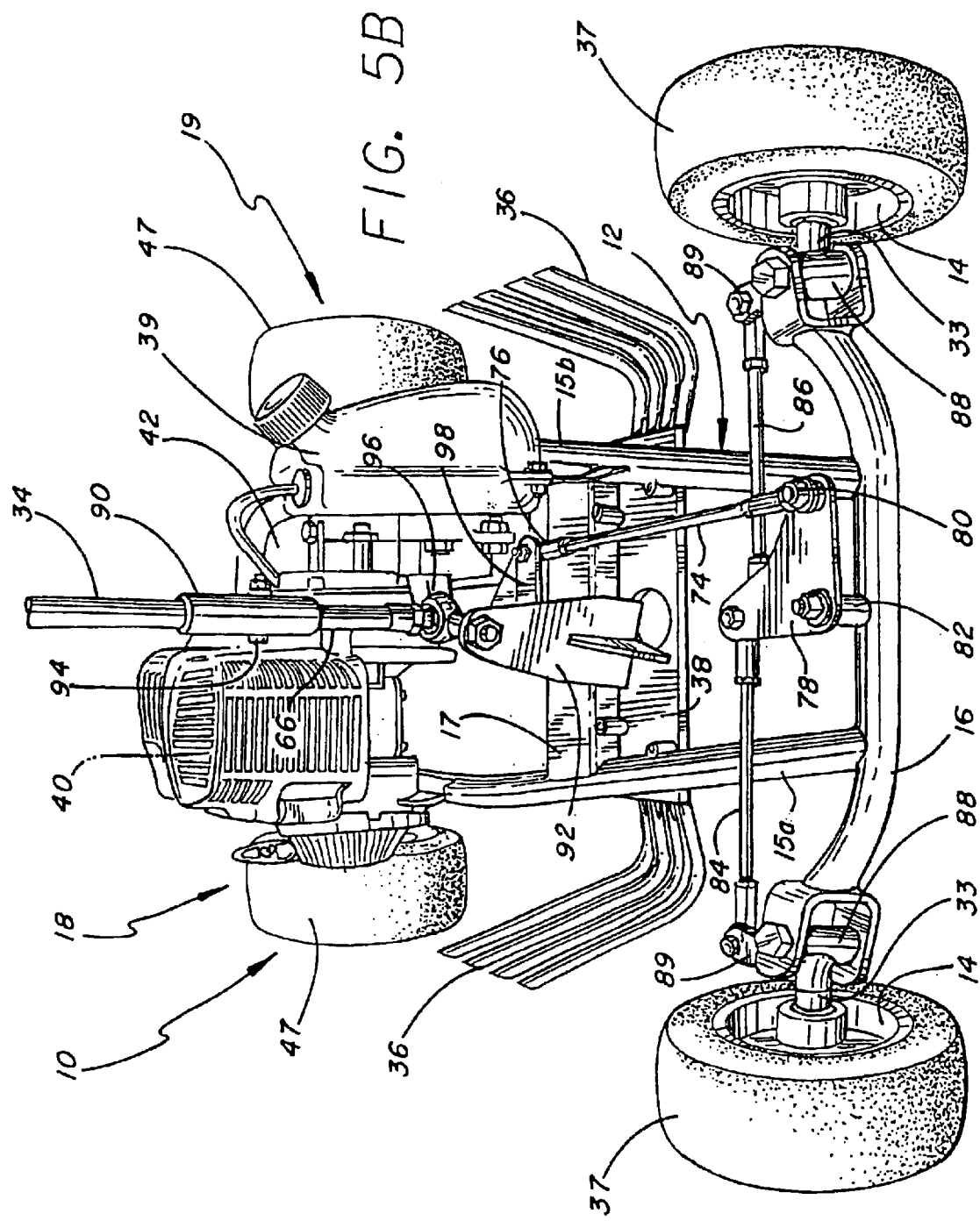
FIG. 5B is a front perspective view showing an alternative configuration of the steering mechanism.
Figure 5C:
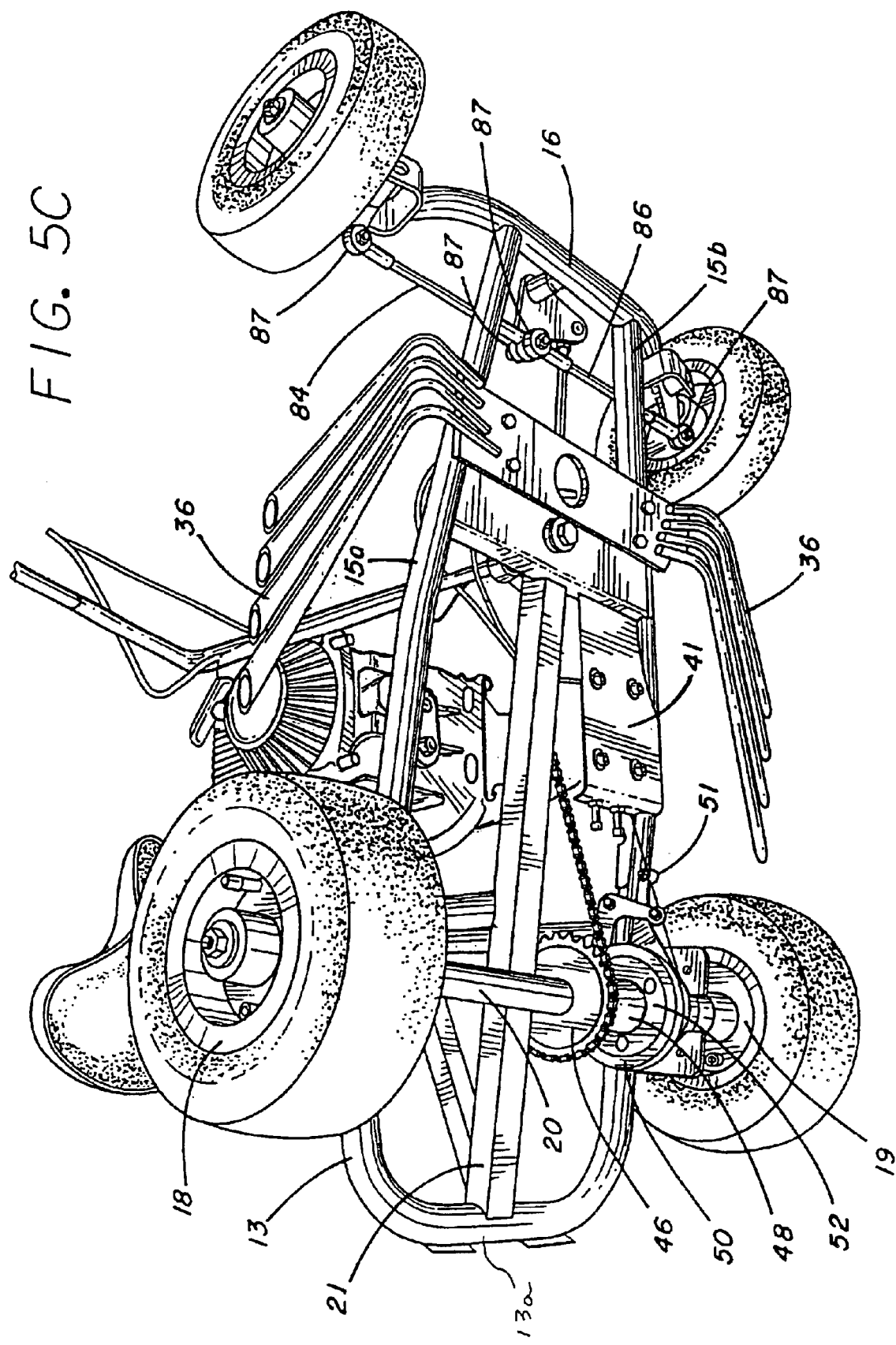
FIG. 5C is a bottom perspective view of the motor vehicle.

As shown in FIGS. 4, 5B and 5C, motor vehicle 10 is powered by a motor 40 mounted on a plate 41. The plate is rigidly fixed to frame 12 between seat standard 23 and transverse member 17 and below seat 26. The center of gravity of the motor is located at a low elevation between the seat standard, the transverse member, and centered between right and left frame legs 15a, 15b to improve stability of the motor vehicle.

The motor may be an internal-combustion engine, an electric motor or any other suitable power plant. If the motor is an internal combustion engine, as shown in FIG. 4, a fuel tank 39 may be disposed to one side of the motor. If the motor is an electric motor, one or more power supplying batteries may be disposed in front of steering column 34, at the location shown for the fuel tank, or at another suitable location within the frame.

Figure 6:
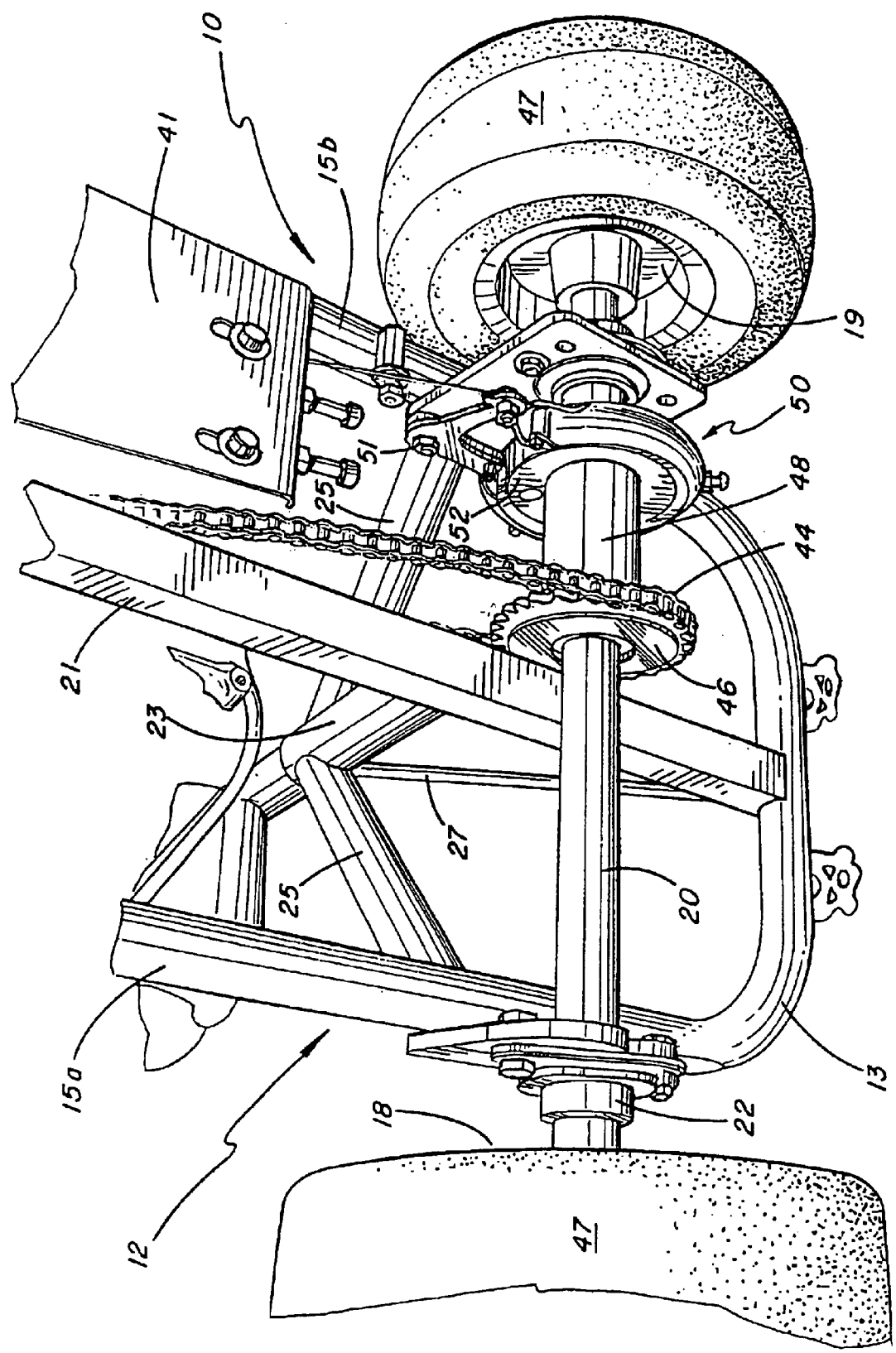
FIG. 6 is a bottom perspective view of the power train.

Motor 40 is coupled to a transmission enclosed in a transmission housing 42 (see FIGS. 5, 5C and 6) to provide a suitable gear reduction of the engine RPM to a transmission output shaft (not shown). The transmission housing 42 is rigidly mounted on plate 41 and coupled to a drive chain 44. The drive chain is coupled to a drive sprocket 46 mounted on rear axle 20. A clutch (not shown) selectively engages the motor with the transmission.

If an electric motor is mounted on plate 41 a transmission will generally not be used. The electric motor can be coupled to rear axle 20 via a chain and drive sprocket arrangement similar to that shown in FIGS. 5C and 6. To reduce noise of the chain and sprockets, the electric motor may be coupled to the rear axle using a combination of pulleys and a drive belt. For example, a motor pulley may be mounted to the output shaft of the electric motor and an axle pulley may be mounted on rear axle 20 in lieu of drive sprocket 46. The pulleys are coupled by a rubberized cog belt in lieu of a drive chain 44.

Rear axle 20 is a "live axle", which axle rotates under imputus of the motor driving the drive sprocket 46 (or pulley). At one end of the rear axle is a rear wheel 18 and at the other end is a rear drive wheel 19. Each of the rear wheels has a metal rim adapted to accept a tire 47 mounted on it. Preferably the tires are of the rubberized, air-filled tube type. The rear tires are wider than the front tires to provide improved traction and stability under power and braking. Rear drive wheel 19 is rigidly mounted to the rear axle so that it rotates with the axle and is the driving wheel. It also provides braking for the vehicle. A brake mechanism 50 is mounted to the frame by steel bolts 51. A brake drum 52 is rigidly mounted to rear axle 20. The brake mechanism includes a brake band 53 for applying friction on the brake drum to brake the rotation of the rear axle and slow or stop the vehicle.

Figure 7:
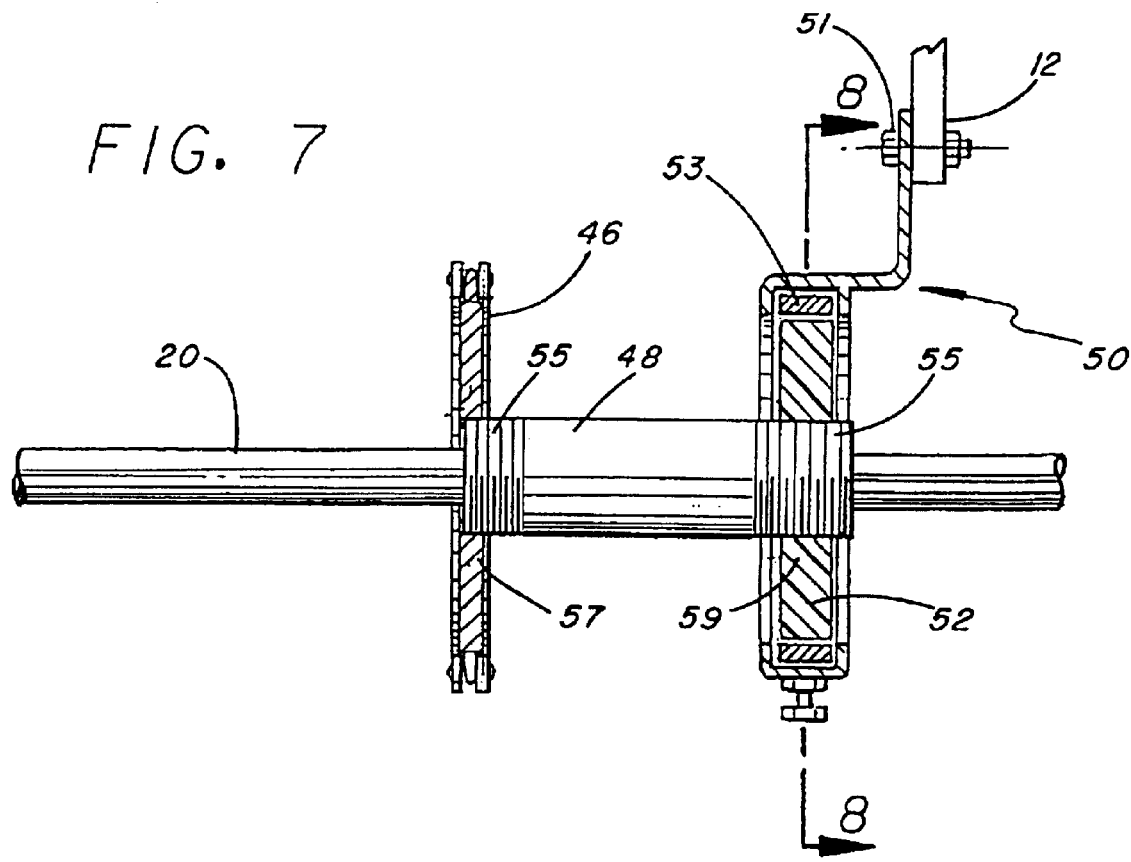
FIG. 7 is a bottom plan view showing the drive sprocket and the brake assembly in cross-section.
Figure 8:
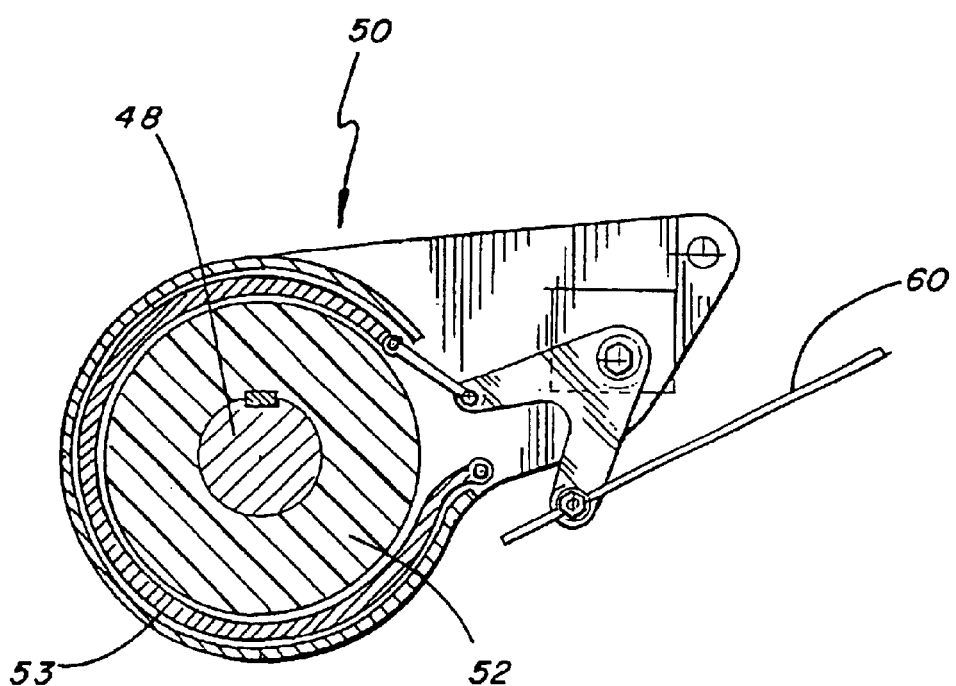
FIG. 8 is a cross-sectional view of the brake assembly, taken along lines 8—8.

Rear axle 20 may be made of aluminum. As shown in FIG. 7, the rear axle includes a section 48 having an enlarged diameter. Drive sprocket 46 (or pulley) is mounted at one end of the enlarged section. The brake drum is mounted at the other end of the enlarged section. A threaded section 55 is provided at each end of enlarged section 48 and a corresponding threaded hole 57 is provided through the center of the drive sprocket. A threaded hole 59 is provided through the center of brake drum 52. Thereby, the drive sprocket and the brake drum may be threadedly mounted on the rear axle.

Rear drive wheel 19 is rigidly fixed to rear axle 20. This can be achieved by providing a slot in the end of the rear axle and a corresponding slot that extends through the drive wheel. With these slots aligned, a steel rectangular rod may be inserted into the slots and secured in place by a hub cap, bolt or the like. Other rear wheel 18 is rotatably mounted on the rear axle. Oil-impregnated bushings may be used to allow wheel 18 and axle 20 to turn together or independently. This permits wheel 18 can turn at a different rate than axle 20 and drive wheel 19 resulting in better maneuverability than if both wheels were rigidly fixed to the axle and always turned at the same rate. By using a single drive wheel, the vehicle has the ability to turn more easily with a relatively short wheel base.

As shown in FIGS. 5 and 5B, one of front wheels 14 is rotatably attached to each end of the front axle 16 via a spindle 33 mounted on a king pin 88 having a projecting steering arm 89. Each of the front wheels is set to a negative camber, i.e., the top of each front wheel is tilted slightly inwardly. Also, each of the front wheels is set in a "toe out" manner, i.e., the front of each of the front wheels is slightly angled away from the longitudinal centerline of frame 12. Such settings of the front wheels aid lateral stability of the vehicle. A front tire 37, preferably of the rubberized, air-filled tube type, is mounted on each of the front wheels.

Removable steering assembly 30 includes a steering bar 32 and a steering column 34 rigidly fixed together. The steering assembly steers the front wheels by turning the steering bar. The steering column is bent or arced toward the front of the vehicle at an angle selected to shift the driver's weight forward sufficiently to provide vehicle stability during acceleration and braking. The lower end of the steering column is removably fixed to a lower steering shaft 66 with a close fit over one end of the lower steering shaft. The steering column includes a slot 62 to receive a mating key 63 located on the upper end of the lower steering shaft. The slot and key align the steering column (and the steering bar) with the lower steering shaft. A releaseable steering clamp 64 is mounted on the steering column for clamping the steering column to the lower steering shaft. The steering column can be removed from the lower steering shaft by opening the steering clamp and sliding the steering column upwardly and completely off the lower steering shaft.

As particularly shown in FIGS. 5, 5A and 5B a steering upright 35 is formed of a metal tube rigidly mounted to transverse member 17. Lower steering shaft 66 is rotatably mounted with the steering upright. The lower steering shaft includes a projecting arm 68 projecting downwardly and has an end 70 with a threaded bore 72. The projecting arm end is rotatably coupled to one end of a steering rod 74 using a Heim joint 76. The body of the Heim joint is mounted to one end of the steering rod. The ball of the Heim joint is mounted to the projecting arm end by a bolt 77 inserted the threaded bore 72. The other end of steering rod 74 is rotatably coupled in a similar manner to a bell crank 78 using another Heim joint 80. The bell crank is rotatably coupled to front axle 16 at a center point 82 of the axle. A tie rod 84 having a Heim joint 87 mounted at each end is rotatably coupled at one end to bell crank 78 and at the other end to steering arm 89 of one front wheel. Similarly, another tie rod 86 is rotatably coupled at one end to the bell crank and at the other end to steering arm 89 of the other front wheel. By using this structure, the rotation of the steering bar about the axis of steering column 34 is transferred to steering bar 74, bell crank 78, and each of tie rods 84, 86 and each of steering arms 89 to turn each of kingpins 88 and thereby steer the front wheels.

FIG. 5A is an exploded view showing assembly of lower steering shaft 66, steering column 34 and steering upright 35. Steering column 34 fits over lower steering shaft 66 to mate slot 62 with mating key 63. Closing clamp 64 locks the steering column to the lower steering shaft. Transverse member 17 and steering upright 35 provide structural strength by having the transverse member made of steel and the steering upright drawn over a mandrel or a thick-walled drawn chromolly tubing. Steering upright 35 is fitted into a bore that extends through transverse member 17 and is welded to the transverse member on both the top and bottom surfaces of the transverse member. An oil-impregnated bronze bushing 103 is inserted into each end of the steering upright. A bolt 100 extends through a washer 102, through the length of the steering upright. Another washer 102 is also fitted over the bolt and a nut 106 is screwed onto the bolt; the washers may be of bronze. Bolt 100 is screwed into a threaded bore 104 in the bottom of lower steering shaft 66, and nut 106 is tightened against the bottom of the lower steering shaft to lock the bolt 100 into the lower steering shaft. Thus, the bolt is rigidly fixed to the lower steering shaft and the washers form mating surfaces against the bushings to allow the lower steering shaft and the bolt to freely rotate relative to the steering upright. This structure provides for easy removal, replacement and alignment of the steering column. At the same time, it provides a strong and rigid structure for the assembly of the steering bar, the steering column, the lower steering shaft, the steering upright and the transverse member. This strength and rigidity allows the structure to be load bearing and the driver can better maneuver the vehicle by applying weight and leverage to the steering bar 32, which is transferred to the transverse member and the vehicle frame.

FIGS. 4 and 5B illustrates an alternative configuration of lower steering shaft 66. A steering column sleeve 90 is rigidly mounted to the top of lower steering shaft 66 and is sized to receive steering column 34. A removable bolt or pin 94 extends through aligned holes in the steering column and the sleeve and retains the steering column in the sleeve. A steering brace 92 is rigidly fixed to and extends upwardly from footrest plate 38 and is laterally offset from the lower steering shaft. The steering brace supports a Heim joint 96, which extends perpendicularly from the steering brace to the lower end of lower steering shaft 66. Steering upright 35 is a short tube that extends through and is welded to transverse member 17. A bolt, like bolt 100, is inserted through the steering upright and through a steering arm 98 mounted on the bolt with set screws to cause the steering arm to turn with the bolt. The bolt is also inserted through the ball of Heim joint 96 into a threaded hole in the bottom of lower steering shaft 66 and is locked in place with a nut. Steering arm 98 projects perpendicularly from the shaft of the bolt and is rotatably coupled to steering rod 74 by a Heim joint 76. The steering rod is coupled to the front wheels 14, as described above.

Referring again to FIG. 4, a throttle control 54 and a brake control 56 are mounted on steering bar 32 for controlling the motor and the brake mechanism, respectively. Each of the throttle control and the brake control is of the spring loaded squeeze-lever type and is located at laterally opposite positions on steering bar 32. Throttle control 54 is coupled to a throttle cable 58 attached to the throttle of motor 40 for controlling the speed of the vehicle. The brake control is coupled to a brake cable 60 attached to the brake mechanism for controlling braking of the vehicle.

The following is a description of a built and operating prototype vehicle. Seat 26 is of the saddle type, which allows the driver to readily shift his weight while operating the vehicle. U-shaped member 13, right and left frame legs 15a, 15b, seat standard 23, side support members 25 and front axle 16 are made of one-inch, round seamless steel tubing. Longitudinal member 21 and rear support member 27 are made of one-inch square steel tubing. The frame members are rigidly connected using welded construction. The approximate external dimensions of the vehicle are 26 inches wide, 42 inches long, and 19 inches high (with steering assembly 30 and seat assembly 24 removed). The wheelbase is approximately 24 inches. The weight of the vehicle is in the range of about 30 pounds to about 50 pounds, including the body, the steering assembly and the seat assembly. Notwithstanding its small size, the vehicle has excellent stability and maneuverability in very small areas. Motor 40 is a gasoline-powered two-cycle engine.

The transmission provides a 5:1 gear reduction of the engine RPM to the output shaft of the transmission. The clutch is a 78 mm centrifugal clutch. The body of the prototype vehicle is a miniature molded fiberglass reproduction of a 1932 Ford roadster. It will be understood, however, that many other body styles can be used, provided that they are appropriately sized to fit the vehicle chassis and accommodate the other elements of the vehicle.

Figure 9:
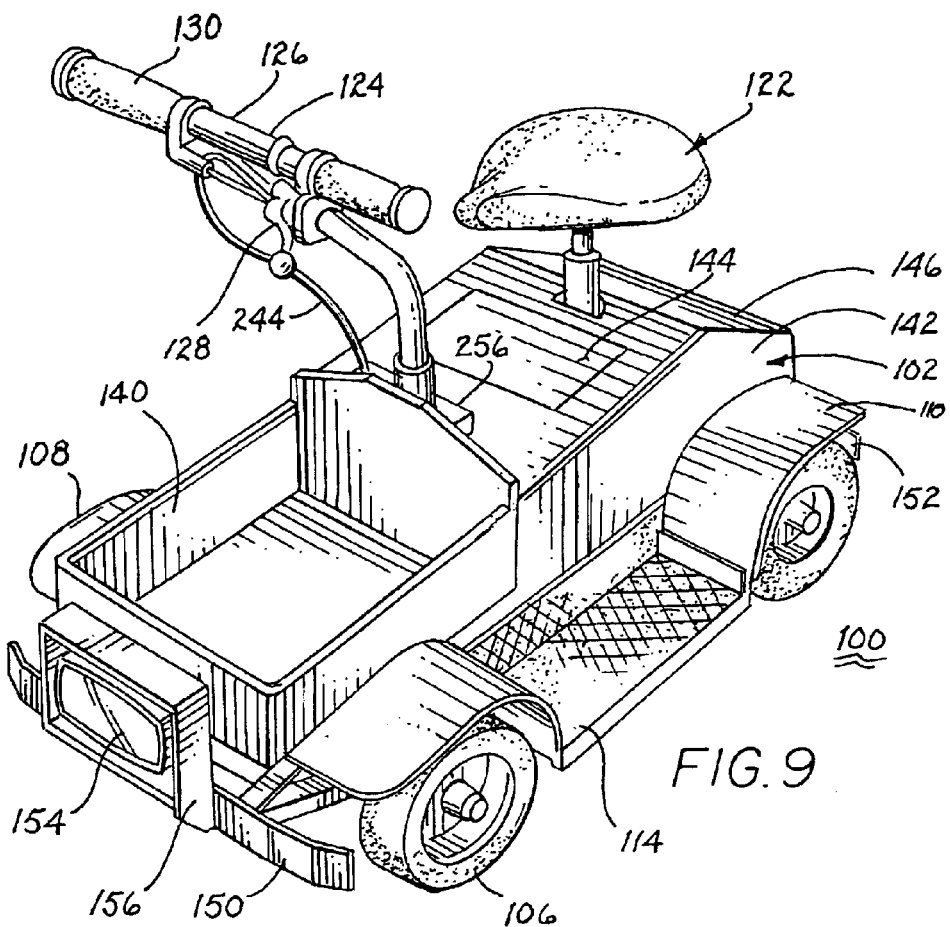
FIG. 9 is a perspective view of a utilitarian miniaturized motor vehicle.
Figure 10:
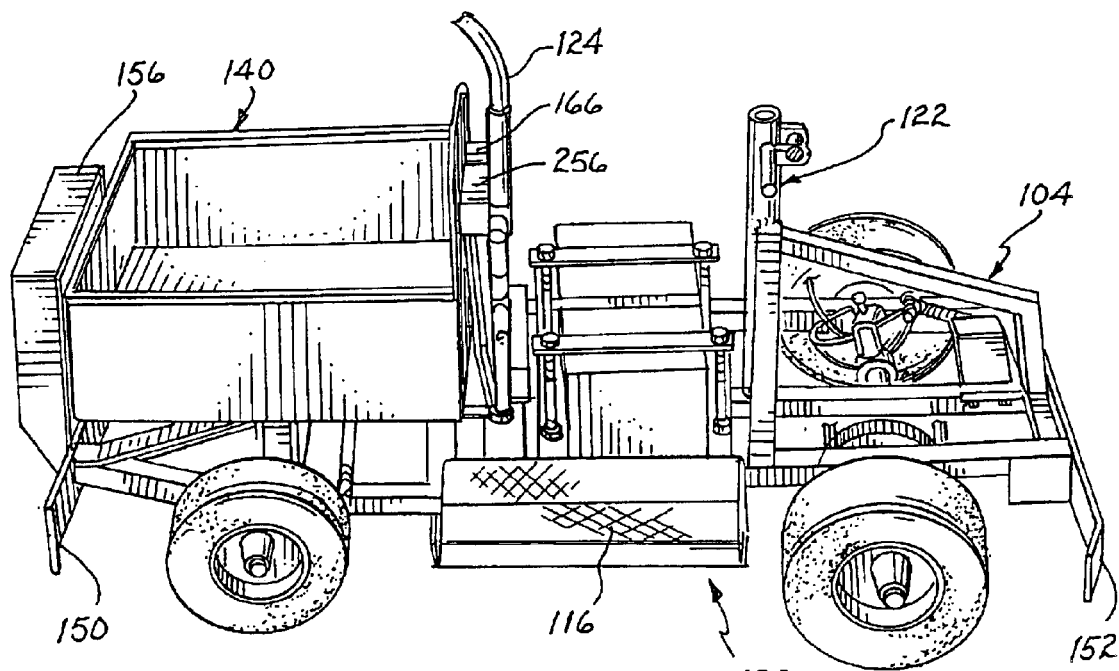
FIG. 10 is a right side view of the utilitarian vehicle with the rear cover removed.
Figure 11:
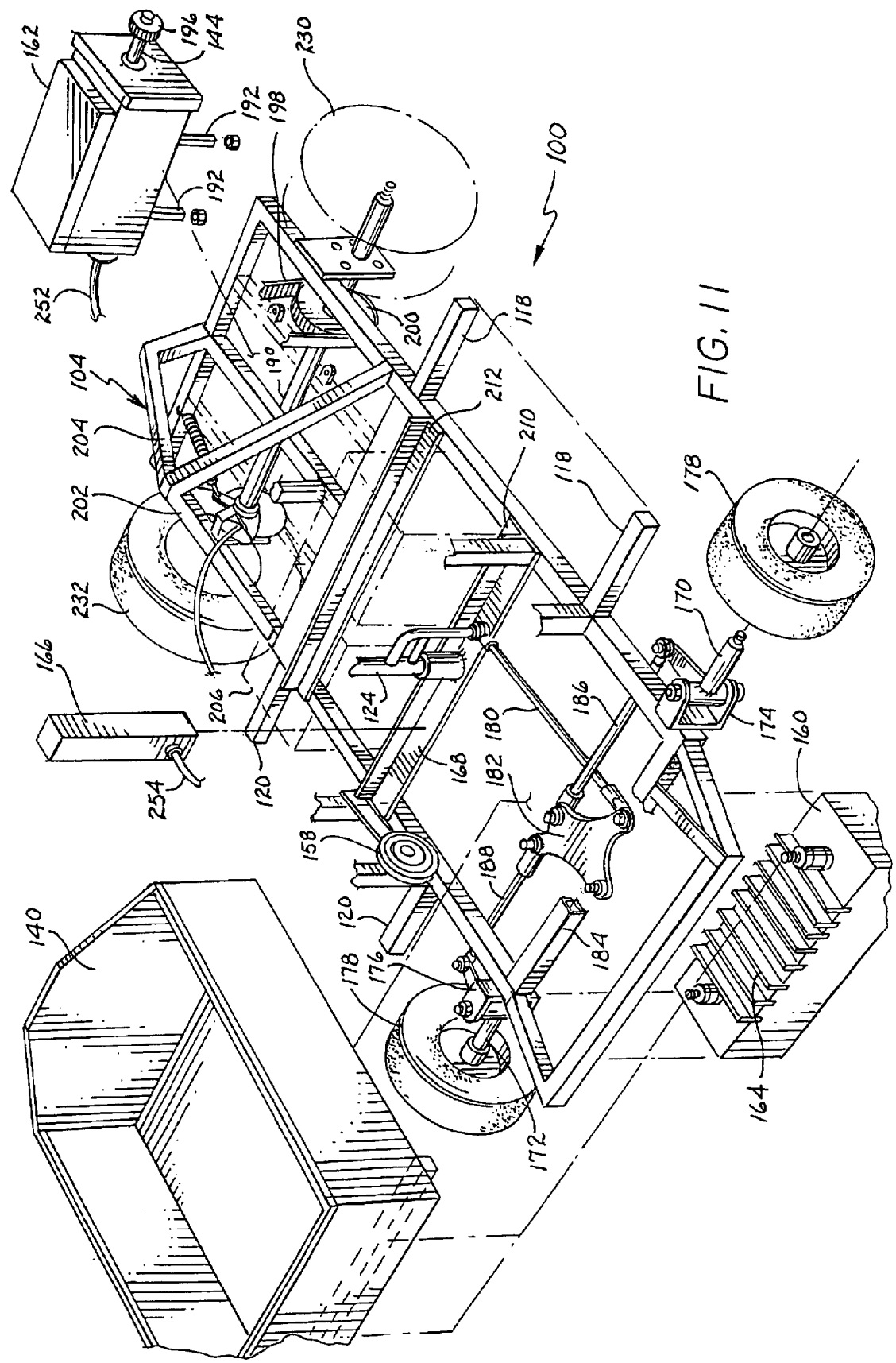
FIG. 11 is an exploded view of the frame of the utilitarian vehicle and various components mounted thereon.

Referring jointly to FIGS. 9, 10 and 11, there is illustrated a utilitarian version of a miniaturized motor vehicle 100 particularly adapted for commercial purposes. Such purposes include transport in and about a warehouse by a watchman making his rounds wherein certain of the corridors or passageways may be relatively narrow. Other persons may use vehicle 100 for purposes of retrieving or storing articles in the warehouse as part of the normal function of the attendant business. Further uses include transport of persons and articles in and about aircraft at an airport for purposes of transporting persons about their business and delivering or retrieving articles both preflight and postflight of an attendant aircraft. Other commercial and practical uses are only limited by one's imagination.

Vehicle 100 includes a body 102 supported upon a frame 104 in the conventional manner. The body supports a pair of front fenders 106, 108 and a pair of rear fenders 110, 112 to prevent dirt spraying from the wheels in the conventional manner. A pair of robust footrests 114, 116 are secured to and extend from frame 104. These footrests are sufficiently robust to permit a driver to lean left or right and support his weight on the respective footrest during such leaning. These footrests are secured to and supported by the frame via a pair of bars 118 extending from one side of the frame and a further pair of bars 120 extending from the other side of the frame. A removable seat assembly 122, as described above, is supported by frame 104. Similarly, a steering assembly 124, which may be of the type and construction described above, is supported by frame 104. Because of the laterally oriented forces that may be imposed on the steering assembly, it may be coupled to compartment 140 by an encircling bracket (not shown) or the like. Handlebar 126 includes not only a lever operated brake handle 128 but also a rotatable handgrip 130 of the type used in motorcycles to control the speed of the driving motor. Body 102 includes a recessed compartment 140 disposed forwardly of the steering assembly, as illustrated. This compartment may be used to transport articles of various sorts, such as tools, flashlights, etc., or replacement parts to be used at a destination location. The body includes side panels 142 along with top panel 146 and removable cover 144 to protect and cover the motor, transmission and other working parts of vehicle 100.

Because vehicle 100 is primarily a utilitarian vehicle, it may be subject to abuse by non-owner drivers going about their business. To protect the vehicle and its operating parts from damage, a front bumper 150 is attached to the front of frame 104. A similar rear bumper 152 is supported by the frame. As use of the vehicle may be in poorly lighted areas, a headlamp 154 is located at the front of the vehicle and protected by a shroud 156 extending thereabout from front bumper 150. As vehicle 100 may include a reverse gear, a loudspeaker 158 may be attached to frame 104 to serve in the manner of a conventional automotive horn. A housing 160 is attached to the front of frame 104 rearwardly of front bumper 150. The housing includes circuitry for controlling the operation of electric motor assembly 162. Because a significant amount of current provided to the motor assembly and as heat will be generated, a heat sink 164 may extend upwardly from housing 160, as illustrated. As the heat sink is at the front of the vehicle, during forward motion air will pass across the heat sink and have a cooling effect by drawing off any heat generated. A further housing 166 may be attached to the rear panel of compartment 140 in a vertical orientation parallel with steering assembly 124 to provide various control functions; note FIGS. 10 and 11. It is to be understood that the circuitry employed to control and regulate operation of motor assembly 162 includes a "soft start" circuitry of any of the types commercially available; such circuitry is necessary from a safety standpoint since it is well known that electric motors have very high torque upon start-up and vehicle 100 may lurch forwardly upon initial operation of the motor assembly unless the electric motor is caused to start slowly or gently. Such lurching may be a safety hazard or cause damage to any articles lodged within the compartment 140.

The steering mechanism attendant vehicle 100 may be the same as the steering mechanism described above with respect to vehicle 10. Alternatively, it may include a pair of kingpins 170, 172 pivotally mounted within respective brackets 174, 176 extending from frame 104 to support wheels 178. Steering assembly 124, shown in part in FIG. 11, operates a steering rod 180 connected to a bell crank 182 pivotally secured to front cross member 184. A pair of tie rods 186, 188 interconnect the bell crank with the arms of kingpins 170, 172. Thereby, the front wheels are steered by rotation of the handlebar of the steering assembly.

Electric motor assembly 162 is attached to the rear of frame 104 and essentially above rear axle 190. It may include extensions or spacers 192 to position the motor assembly at an appropriate height and to attach it to the frame. Furthermore, the motor assembly may include a pivot mounting to permit swinging the motor assembly to tighten and loosen cog belt 198 and spacers 192 would serve the function of locking the motor assembly in place. The motor includes an output shaft 194 supporting cog wheel 196 engagement with cog belt 198. The belt in turn is in engagement with a cog wheel 200 secured to rear axle 190 in the conventional manner. Thereby, slippage between output shaft 194 and rear axle 190 is essentially eliminated and any rotation of the motor will result in commensurate rotation of the rear axle. Such lack of slippage provides a high degree of control over movement of vehicle 100, whether forwardly or rearwardly. Furthermore, if the vehicle is moving when power to the motor assembly is shut off, the motor assembly will serve in the manner of a soft brake to slow down movement of the vehicle.

To protect the motor assembly and other components rearwardly of the seat assembly, as well as to provide rigidity to the frame, a lateral truss 202 may extend upwardly from opposed sides of the frame. A further truss 204 may extend from the apex of truss 202 to the rear of the frame. As shown in phantom lines in FIG. 11, a large battery or a pair of batteries 206 are mounted proximately midway of the frame and between the seat assembly and the steering assembly. As the batteries are relatively heavy, they are purposely mounted at the approximate center of gravity of the vehicle to prevent them from having any significant moment arm that might impede or tend to impede turning of the vehicle while underway.

Figure 14:
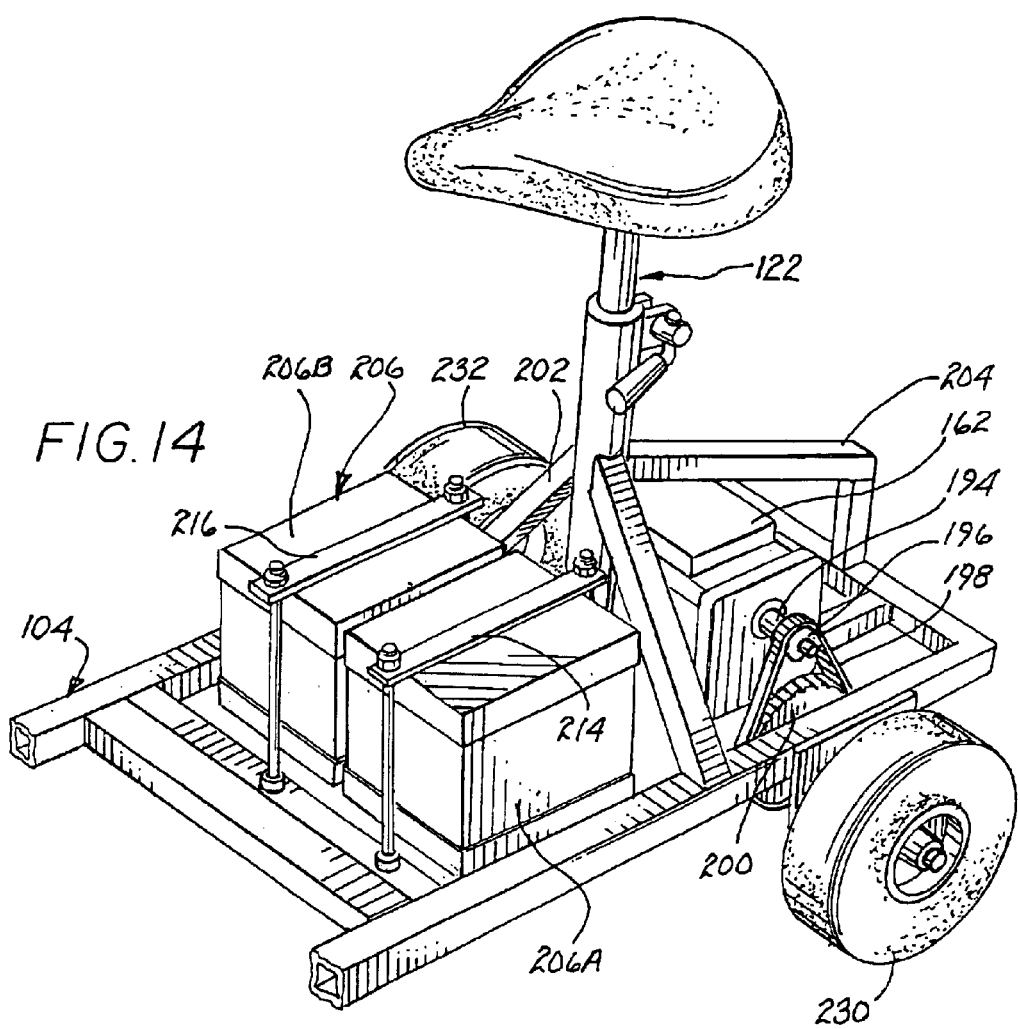
FIG. 14 illustrates the batteries and electric motor mounted at opposed sides of the seat assembly.

Referring jointly to FIGS. 11 and 14, certain details attendant the motor assembly will be described. Herein, a pair of batteries 206A and 206B are illustrated. These batteries rest upon cross members 210, 212 extending across the frame. Conventional battery tie down elements 214, 216 retain batteries 206A, 206B attached to the cross members.

Figure 13:
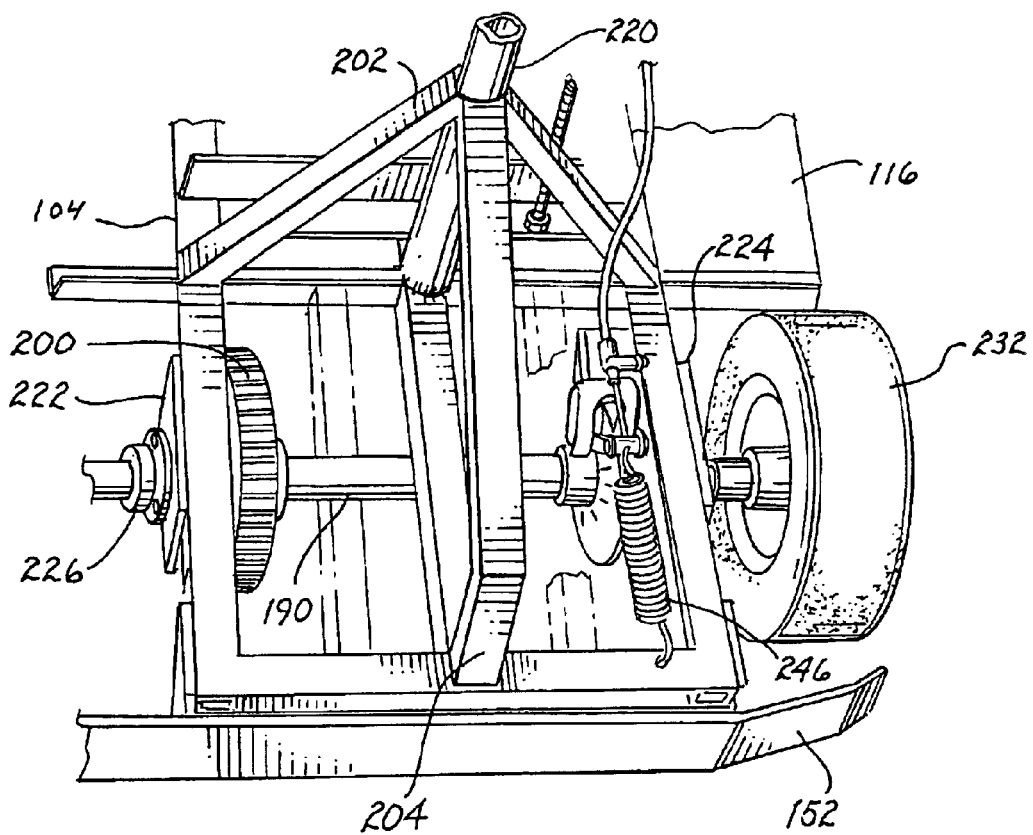
FIG. 13 is a top view of the rear axle and related components.

As shown in further details in FIGS. 11, 13 and 14, the apex of trusses 202, 204 may be in engagement with seat standard 220 provides support for the seat assembly, as well as serving the afore mentioned purpose of adding rigidity to the frame and protecting the drive train elements.

Rear axle 190 is supported beneath frame 104 by a pair of downwardly extending plates 222, 224. These plates place the axis of rotation of axle 190 significantly below the axis of rotation attendant the front wheels relative to the frame as the latter axis of rotation extends essentially through the frame. The resulting lowered rear axle will cant frame 104 forwardly downwardly to provide an element of stability to the vehicle, as discussed above. Each of plates 222, 224 supports a conventional journal 226, 228 to accommodate rotation of the rear axle. As noted above with respect to vehicle 10, only one of the rear wheels is a driven wheel with the other wheel being rotatably mounted upon the axle. This prevents slippage of one of the wheels during turns which results in scrubbing and wear of both tires and, more importantly, provides more precise control during maneuvering of the vehicle.

Figure 12:
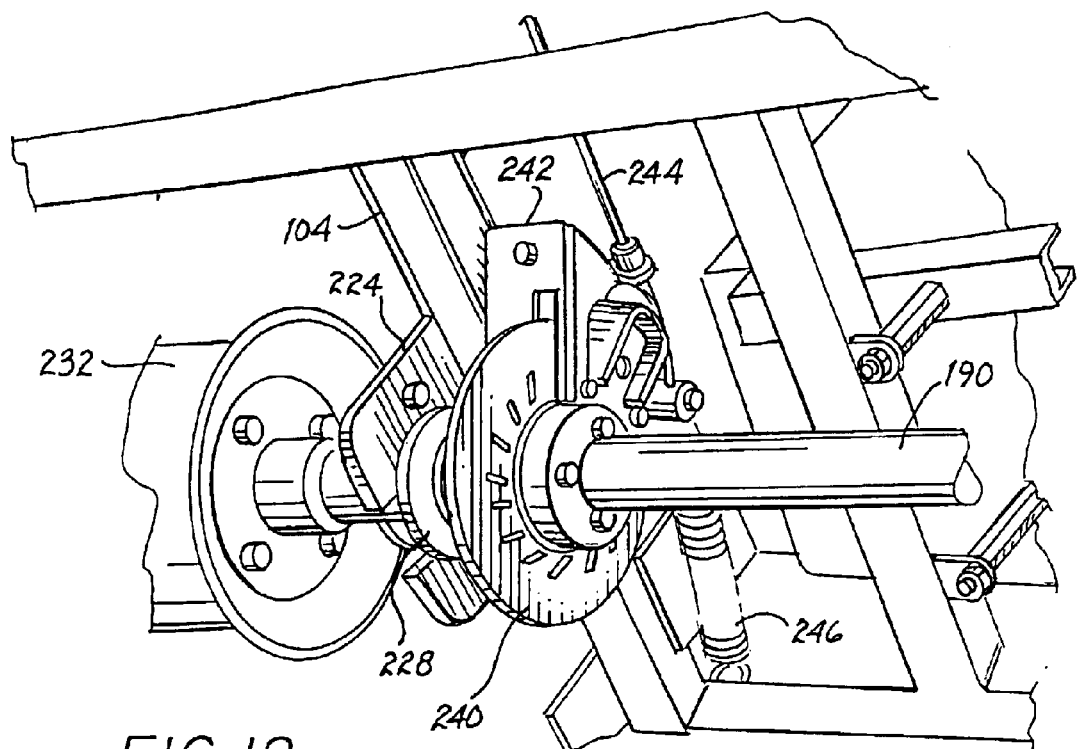
FIG. 12 illustrates the brake assembly mounted at the rear axle.

The brake assembly will be described with primary reference to FIGS. 12 and 13. A disc 240 is rigidly mounted on rear axle 190 in the conventional manner. A caliper assembly 242 is attached to frame 104 in proximity with the disc. The caliper assembly includes a pair of opposed calipers and attendant brake pads to apply pressure through the brake pads against opposed sides of disc 240. The resulting friction will restrain rotation of the disc and braking rotation of the rear axle and attached wheels will occur in the normal manner. The disc brake is actuated by the lever mounted on the handlebar and identified by numeral 128 and acting through a cable 244. To insure release of the brake pads when the brake mechanism is released, a spring 246 is employed to reposition the caliper and the attendant brake pads and prevent the brake pads from remaining in contact with disc 240. It is to be noted that the brake assembly may be mechanically or hydraulically operated.

Figure 15:
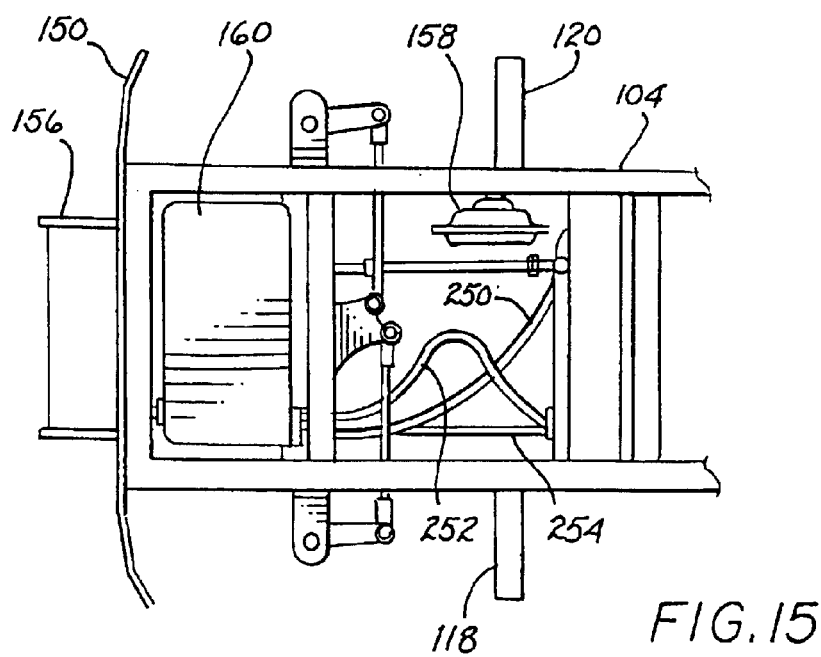
FIG. 15 is a top view of the front of the frame and related components.

As shown in FIG. 15 in particularly, electric power from batteries 206A, 206B is conveyed to circuitry within housing 160 by electrical conductor 250. Output power from the electrical circuitry is conveyed to motor assembly 162 via electrical conductor 252. The control circuitry within housing 166 conveys control signals to the electric circuitry in housing 160 via an electrical conductor 254. Although not shown in detail, a control panel 256 may be located adjacent steering assembly 124 to the rear of compartment 140. It may include a key operated lock to prevent unauthorized activation of the motor assembly. Switches to control forward or reverse movement may be employed. Additionally, gauges and switches may be incorporated for the purpose of determining the voltage, current flow and amount of power remaining in batteries 206A, 206B. A horn (not shown) may be mounted at the rear of the vehicle to be automatically actuated upon rearward movement of the vehicle. A horn button for selectively actuating loudspeaker 158 may also be mounted on the control panel.

The above-described motor vehicle possesses several advantages. It provides a small, high-visibility, four wheeled motorized vehicle that is very stable and maneuverable. The vehicle is lightweight and can be easily stored or transported in a small space. While being small in size and lightweight, the vehicle is capable of transporting a grown adult in a seated position and can be readily and conveniently adjusted to accommodate drivers of various sizes.

I claim:

1. A highly maneuverable and stable small sized motorized four wheel vehicle for transporting children or adults, said four wheel vehicle comprising in combination:
 a) a frame;
 b) a front axle for supporting a front wheel at each opposed end;
 c) a steering assembly for turning said front wheels, said steering assembly including a steering column extending up and canted forwardly, said steering column being adapted to swing a rider's upper body in the direction of a turn to shift the center of gravity laterally into the turn;
 d) a rear live axle for supporting a rear wheel at each opposed end, one of said rear wheels being rigidly attached to said live axle and the other of said rear wheels being attached to said live axle through a fitting adapted to accommodate independent rotation of said other rear wheel relative to said one rear wheel, including plates extending downwardly from said frame for supporting said rear axle and adapted to cant said frame forwardly downwardly;
 e) a seat assembly for supporting the rider, said seat assembly including a seat standard mounted forwardly of said live axle;
 f) an electric motor mounted on said frame at a location substantially above said rear axle, said motor including an output shaft;
 g) at least one battery mounted at a location on said frame intermediate said seat assembly and said steering assembly, which location is adapted to be close to the center of gravity of said vehicle;
 h) a drive train interconnecting said motor with said rear axle, said drive train including a cog wheel mounted on said output shaft, a further cog wheel mounted on said rear axle and a cog belt interconnecting said cog wheel and said further cog wheel to cause rotation of said one rear wheel; and
 i) a compartment located forwardly of said steering assembly, said compartment being adapted to transport articles placed therein.

2. The four wheel vehicle as set forth in claim 1 including a manually operated clamp for disengageably engaging a part of said steering assembly with said frame.

3. The four wheel vehicle as set forth in claim 2 wherein said clamp is adapted to accommodate extension and retraction of said steering assembly to a selectable height.

4. The four wheel vehicle as set forth in claim 1 including a manually operated clamp for disengageably engaging a part of said seat assembly with said frame.

5. The four wheel vehicle as set forth in claim 4 wherein said clamp is adapted to accommodate extension and retraction of said seat assembly to a selectable height.

6. The four wheel vehicle as set forth in claim 5 including a further manually operated clamp for disengageably engaging a part of said steering assembly with said frame.

7. The four wheel vehicle as set forth in claim 1 including a footrest disposed at each opposed side of said frame extending laterally therefrom and intermediate said front axle and said rear axle for supporting the rider's feet.

8. The four wheel vehicle as set forth in claim 1 including a body mounted on said frame, said body being adapted to accommodate extension of said steering assembly and said seat assembly above said body.

9. The four wheel vehicle as set forth in claim 1 wherein said front and rear wheels include tires, said tires of said rear wheels being of a width greater than the width of said tires of said front wheels.

10. The four wheel vehicle as set forth in claim 1 including a manually operated brake for braking rotation of said live axle.

11. The four wheel vehicle as set forth in claim 10 wherein said brake comprises a disc brake.

12. The four wheel vehicle as set forth in claim 1 including a manually operated throttle for controlling operation of said electric motor.

13. The four wheel vehicle as set forth in claim 12 including circuitry for controlling operation of said electric motor in response to said throttle.

14. The four wheel vehicle as set forth in claim 13 wherein said circuitry includes a soft start for said electric motor.

15. The four wheel vehicle as set forth in claim 13 wherein said circuitry is adapted to control operation of said electric motor to control operation of said electric motor selectively move said vehicle forwardly and rearwardly.

16. A highly maneuverable and stable small sized motorized four wheel vehicle for transporting children or adults, said four wheel vehicle having a center of gravity and comprising in combination:
   a) a frame;
   b) a front axle for supporting a front wheel at each opposed end;
   c) a steering assembly for turning said front wheels in the direction of a turn, said steering assembly including a steering column extending up and canted forwardly, said steering column being adapted to swing a rider's upper body in the direction of a turn to shift the center of gravity laterally into the turn;
   d) a rear live axle for supporting a rear wheel at each opposed end;
   e) a seat assembly for supporting the rider, said seat assembly including a seat standard mounted forwardly of said rear axle;
   f) a motor mounted on said frame at a location substantially above said rear axle;
   g) a drive train interconnecting said motor with said rear axle; and
   h) a compartment located forwardly of said steering assembly, said compartment being adapted to transport articles placed therein.

17. The four wheel vehicle as set forth in claim 16 including a throttle mounted on said steering assembly for controlling operation of said motor.

18. The four wheel vehicle as set forth in claim 16 including spacers extending from said frame for supporting said rear axle and adpated to cant said frame forwardly downwardly.

19. The four wheel vehicle as set forth in claim 16 wherein said front and rear wheels include tires, said tires of said rear wheels having a first width and said tires of said front wheels having a second width and wherein the first width is greater than the second width.

20. The four wheel vehicle as set forth in claim 16 including a manually operated brake for braking rotation of said rear axle.

21. The four wheel vehicle as set forth in claim 20 wherein said brake includes a disc brake mounted on said rear axle.

22. A highly maneuverable and stable small sized motorized four wheel vehicle for transporting children or adults, said four wheel vehicle comprising in combination:
   a) a frame;
   b) a front axle for supporting a front wheel at each opposed end;
   c) a steering assembly for turning said front wheels;
   d) a rear live axle for supporting a rear wheel at each opposed end, one of said rear wheels being rigidly attached to said live axle and the other of said rear wheels being attached to said rear axle through a fitting adapted to accommodate independent rotation of said other rear wheel relative to said one rear wheel;
   e) a seat assembly for supporting the rider, said seat assembly including a seat standard mounted forwardly of said rear axle;
   f) an electric motor mounted on said frame at a location rearwardly of said seat standard;
   g) a drive train interconnecting said motor with said rear axle;
   h) at least one battery for providing electric power to said motor, said at least one battery being mounted on said frame intermediate said seat standard and said steering assembly; and
   i) control circuitry for controlling operation and rate of rotation of said motor in response to a throttle.

23. A four wheeled vehicle as set forth in claim 22 including spacers extending from said frame for supporting said rear axle and adapted to cant said frame forwardly downwardly.

24. The four wheel vehicle as set forth in claim 22 including a manually operated brake for braking rotation of said live axle.

25. The four wheel vehicle as set forth in claim 22 wherein said circuitry includes a soft start circuitry for limiting the rate of initial rotation of said motor.

26. The four wheel vehicle as set forth in claim 22 wherein said throttle is mounted on said steering assembly.

* * * * *